United States Patent [19]
Leib

[11] Patent Number: 6,021,008
[45] Date of Patent: Feb. 1, 2000

[54] BEAM SCATTERING LASER RESISTANT STRUCTURE

[75] Inventor: Kenneth G. Leib, Wantagh, N.Y.

[73] Assignee: Northrop Grumman Corporation, Los Angeles, Calif.

[21] Appl. No.: 05/526,604

[22] Filed: Nov. 22, 1974

[51] Int. Cl.[7] ............................... G02F 1/36; G02B 5/04; G02B 5/30

[52] U.S. Cl. ........................... 359/886; 359/887; 359/890

[58] Field of Search ..................................... 350/162, 168, 350/267, 321; 332/7.51; 250/510, 514, 515, 517; 343/18 E, 18 A; 428/112, 913; 109/29; 219/121 C, 121 LM; 244/121, 117 A, 129 W; 102/105; 89/36 A; 165/47; 359/886, 887, 890

[56] References Cited

U.S. PATENT DOCUMENTS

| | | | |
|---|---|---|---|
| 2,287,598 | 6/1942 | Brown | 350/162 R |
| 3,492,062 | 1/1970 | Haover | 350/312 |
| 3,813,511 | 5/1974 | Staal | 219/121 LM |

OTHER PUBLICATIONS

Spencer et al, "1 R Laser Radiation Eye Protector", Oct. 1972, pp. 1545–1546, Rev. Sci. Inst., vol. 43, #10.
De Mert, "Directed Energy Weapons", Aug. 1962, pp. 92–96, Electronics Industries.
Singer et al, "Diffraction of light from a Filomentary Source . . . ," Dec. 1970, pp. 1640–1653, Jour. Opt. Soc. Amer., vol. 60, No. 12.

Primary Examiner—Nelson Moskowitz
Attorney, Agent, or Firm—Terry J. Anderson; Karl J. Hoch, Jr.

[57] ABSTRACT

A multi-layer structure for controlling the transmission laser radiation including an array of polydispersing scatterers in an intermediate layer. The outer layer is made of a material which partially ablates when exposed to incident laser radiation, generating an irregular surface which initially scatters the incident laser radiation. The initially scattered radiation is transmitted to the intermediate layer containing the array of monofilament fibers which further scatters the laser such that combination achieves substantial attenuation of on-axis transmission of the laser radiation in an otherwise transparent structure.

5 Claims, 2 Drawing Sheets

BEAM SCATTERING LASER RESISTANT STRUCTURE

BACKGROUND

The present invention relates to a multi-layer structure for controlling the transmission of laser radiation, and more specifically to a multi-layer structure whose outer layer partially ablates to form an irregular surface when exposed to laser radiation and whose intermediate layer contains a diffractive array of monofilament fibers, the outer and intermediate layers thereby significantly attenuating the on-axis transmission of the incident laser radiation. This invention may be used in such structures as aircraft canopies and windshields, helmets and glasses.

The following co-pending applications by the same Applicant are related to the present application:

1. "Partially Ablating Laser Resistant Structures", Ser. No. 526,602, filed simultaneously with the present application;

2. "Heat Conducting Laser Resistant Structures", Ser. No. 526,603, filed simultaneously with the present application; and 3. "Absorbent Laser Resistant Structure", Ser. No. 526,605, filed simultaneously with the present application.

In recent years there has been considerable interest in and a growing development of high intensity lasers. By optical radiation as used herein is meant any portion of the electromagnetic spectrum between about 0.4 and about 15.0 micrometers, and is not confined to the visible portion of the spectrum. Already, considerable effort has been directed toward the development of communication systems utilizing lasers while further technical development is being directed toward the use of a laser as a weapon against aircraft.

Many current optical devices are fabricated with glass, glass laminates, plastics and plastic laminates to achieve various effects under sunlight or artificial light conditions. Several of these devices have been designed with the idea that light will be diminished as it passes through the device. Many modern applications require these devices to transmit light in the visible portion of the spectrum but diminish light from high intensity laser radiation.

To date, laser weapons have two practical threat wavelengths:

1) approximately 10 micrometers (infrared; and, 2) the range 3 to 5 micrometers.

Depending upon the type of material exposed to the incident laser beam, the energy from each of these threat wavelengths will either be absorbed by or transmitted through the layer of material. In general, however, plastics will be absorbing to the 10 micrometer laser while some will transmit in the 3–5 micrometer range. Thus, based upon intelligence reports different structures will be employed according to which laser wavelength is anticipated.

One light disruptive device is disclosed in the patent to Horton, U.S. Pat. No. 3,561,842. The structure relies on the heating effect of absorbed high-intensity optical radiation to destroy a film of light transmissive material which is bonded to a roughened substrate. When high intensity optical radiation impinges the film surface, the energy is absorbed and the film is destroyed, exposing the roughened substrate which deflects the beam. The roughened substrate is a source of possible shortcomings in that it presents additional steps in fabrication, difficulties in providing a continuous index of refraction and an increased absorptivity to radiation due to the roughened surface. In addition the roughened substrate is a pre-induced damage control device whereas the present invention concerns a self-induced damage mechanism.

Aircraft canopies and windscreens have generally been designed for aerodynamic and economic reasons rather than for laser weapon protection. They are constructed to incorporate the following characteristics:

a) Aerodynamic compatibility with the shape factor of the aircraft;

b) Structural soundness under prescribed aerodynamic environments;

c) Good visibility (transparency in the visible portion of the spectrum); and d) Ease of fabrication.

However, in view of the developments in laser technology, it is now desirable that aircraft canopies and windscreens also:

e) be capable of withstanding laser radiation for a sufficient time (e.g. t >1 second) to enable the pilot to assume a change in aircraft attitude;

f) be aerodynamically sound to enable the pilot to carry out his assigned mission and/or return to his home base after having been exposed to some maximum level of radiation;

g) to reduce the on-axis level of radiation transmitted, thereby lowering the level of exposure to the pilot.

SUMMARY OF THE INVENTION

It is therefore an object of the present invention to provide laser resistant structures for attenuating high energy laser radiation.

It is another object of the present invention to provide laser resistant structures having improved heat resistant and absorption properties.

A further object of the present invention is to provide laminated structures having variable light transmission properties.

A still further object of the present invention is to provide a laminated laser resistant structure for protection in a high intensity laser radiation environment.

A still further object of the present invention is to provide a laminated structure for protection in a high intensity laser radiation environment in which the wavelength of the radiation is altered.

Other objects, aspects, and advantages of the present invention will be apparent when the detailed description is considered with the figures of the drawing.

A laser resistant structure is provided for aircraft windscreens or canopies which is capable of furnishing an aerodynamically functional form and also mitigating the effect of incident laser radiation. The reduced effectiveness of the laser beam affords a pilot the time to assume a defensive attitude or an offensive posture. Further protection for the pilot and/or aircraft crew can be realized by providing these personnel with improved safety glasses and/or helmets which, in conjunction with the improved canopy and/or windscreen, would extend aircraft capability through increased pilot protection.

The principle of operation of the present invention emanates from self-destructing irreversible material processes resulting from exposure to laser radiation in conjunction with monofilament fiber scatterers to subsequently inhibit on-axis transmission of the radiation.

According to the present invention, the level of radiation penetrating the laser resistant structure is reduced substantially by controlled absorption of the laser beam by the outer layer whereby the outer layer partially ablates to initially scatter the laser and by further scattering through a diffractive array of monofilament fibers in the intermediate layer.

DETAILED DESCRIPTION OF THE PREFERRED EMBODIMENT

Figure 1A:
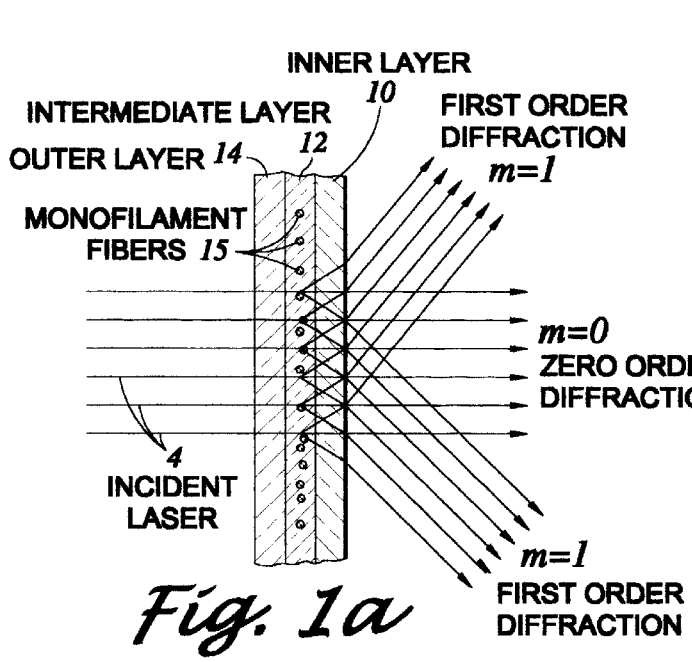
FIGS. 1a, 1b, 1c, 1d and 1e illustrate diffractive array forms of the laser resistant structure according to the present invention.

Referring to FIG. 1a, the laser resistant structure includes an outer layer 14, an intermediate layer 12 and an inner layer 10. The three layers have identical or virtually identical indices of refraction in the visible portion of the electromagnetic spectrum. The coefficients of absorption of the layers at threat wavelengths hold the following relation:

$$\alpha_{14} \cong \alpha_{10} >> \alpha_{12}.$$

Thin monofilaments, 15, are imbedded, regularly or nearly regularly and substantially parallel to each other, in the intermediate layer. The index of refraction in the visible range of the electromagnetic spectrum, n, of the monofilaments is substantially equal to that of the host layer so that the structure comprises an electromagnetic continuum at wavelengths of visible light. However, at the wavelengths of laser radiation, the index of refraction of the monofilaments is different from that of the host layer, thereby giving rise to scattering of the incident beam. It has been found that a variation in the index of refraction of approximately 0.001 is close to the threshold for non-tolerable visible optical deformation.

Figure 2:
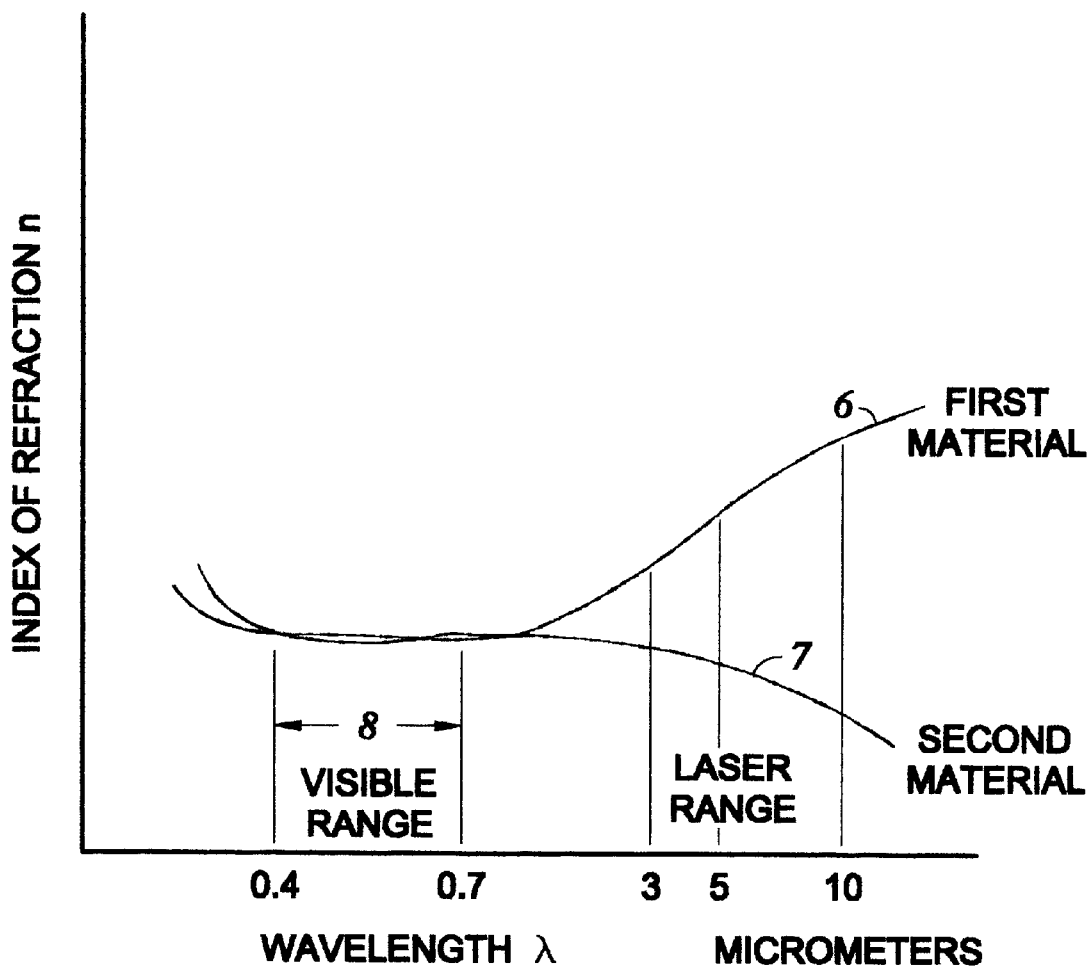
FIG. 2 illustrates an optical property of different materials having substantially equal indicies of refraction in the visible portion of the electromagnetic spectrum.

For illustrative purposes, a typical distribution of index of refraction as it varies with wavelength is shown in FIG. 2. In this figure, curve 6 represents the index of refraction distribution for the monofilaments and curve 7 represents the index of refraction distribution for the host material of lamina 12. That range of wavelengths labeled 8 represents the visible portion of the spectrum. It is apparent from the figure that when laser radiation of wavelength $\lambda_o$ is considered, there is a significant difference between the indices of refraction given by the curves 6 and 7 for the monofilaments and host materials respectively.

Referring back to FIG. 1a, when high intensity laser radiation, more appropriately having a wavelength of from 3 to 5 microns, is incident upon layer 14, layers 14, 12 and 10 are partially transmitting to the incident wavelength while layer 14 will also be absorptive at that wavelength. Layer 14 will immediately begin to ablate, leaving a roughened surface which will scatter that portion of the incident beam which is transmitted to layer 12. This initial diffraction of the incident beam will increase even further as ablation advances. The portion transmitted to layer 12 will be further diffracted by the array of monofilaments 15 according to the equation $$(\text{Sin}\theta_i \pm \text{Sin}\theta_d) = \frac{m\lambda}{b} \qquad (1)$$

where $\lambda$ is the wavelength of incident laser radiation (here $\lambda_o$), b is the spacing between the monofilaments, m is the order of diffraction which may take on positive or negative integral values $0, \pm 1, \pm 2 \ldots$, $\theta_d$ is the angular deviation through which the laser beam is diffracted measured from the normal to the plane containing the monofilaments 15, and $\theta_i$ is the incident angle measured from the normal to the plane containing the monofilaments. When $\theta_i$ and $\theta_d$ are on the same side of the normal, the positive (+) sign is used; when on opposite sides, the minus (−) sign is used. In FIG. 1a, the angle of incidence is shown to be zero.

It is well known in the diffraction art that the amount of radiation contained in each of these orders will vary and that the radiation transmitted along the line of the incident radiation which is the zero order, or m=0, can be significantly less than the incident radiation. It is also well known in the art that the shape of the diffracting elements, the monofilaments 15, is a determining factor in distributing the incident energy into the various orders; thus one can further reduce the laser intensity transmitted along the incoming direction by properly shaping the cross-sectional configuration of the monofilaments such as cylindrical or concave. (Transmission of monofilaments at threat wavelength is not required.)

Figure 1C:
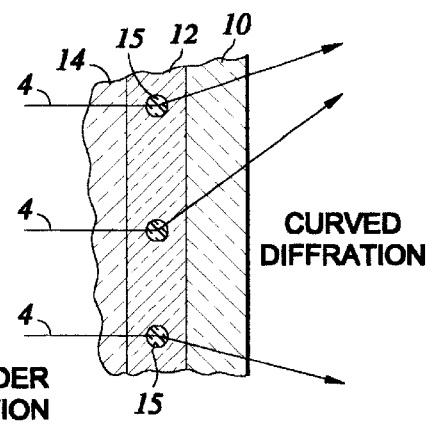
Figure 1B:
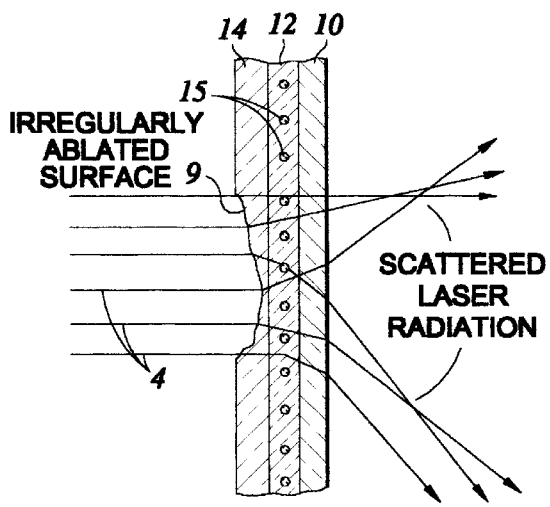

FIG. 1b is a configuration in this invention similar to that of FIG. 1a wherein those elements 14, 12 and 10 the outer, intermediate and inner layers respectively with monofilaments 15 imbedded in layer 12. The incident laser radiation 4 has irregularly ablated a portion of lamina 14, an occurrence in this configuration of the invention commonly encountered when the incident radiation has a high intensity and lamina 14 has a high absorption to the radiation at the same wavelength as the incident radiation, namely $\lambda_o$. The irregular ablation establishes a highly irregular interface on the surface of lamina 14. The rays of the incident radiation are thereafter optically and irregularly refracted according to Snell's Law.

$$n \, \text{Sin} \, \theta_i = n_{14} \, \text{Sin} \, \theta_{14}$$

where n is the index of refraction of the medium in which the radiation is present, commonly air, and $n_{14}$ is the index of refraction of the material of layer 14. Both indices are to be taken at the wavelength of the radiation, $\lambda_o$. The angles $\theta_i$ and $\theta_{14}$ are the incident and refracted angles respectively, with refraction taking place in lamina 14. This refraction causes a multiplicity of incident angles to be transmitted to the interface of laminae 14 and 12. Each ray of the incident beam is refracted by this principle so that the radiation striking the diffractive array of monofilaments will be widely spread, having undergone an initial reduction in on-axis intensity. The beam reaching the monofilaments will be further diffracted by the monofilaments in accordance with the discussion above.

Recent developments in fabrication enable the use of monofilaments in the structure which have a varying index of refraction for the laser radiation across their cross-section. Thus, for that portion of the laser beam which is transmitted through the monofilaments, it will be refracted away from axis of the incident beam within the monofilament itself, further reducing the on-axis intensity. FIG. 1c shows a three layer structure which incorporates these monofilaments 15 in layer 12. The incident laser, after partially ablating layer 14 will be diffracted away from its original axis at six interfaces and within the monofilaments themselves in this manner; at the ablated surface, at the interface between layer 14 and 12, at the interface between layer 12 and the monofilament surface, within the monofilament, at the interface between the monofilament and layer 12, at the interface between layer 12 and 10, and at the inside surface of layer 10. Therefore, the incident beam will be dispersed with great variance depending on where each "ray" enters, so that the on-axis intensity is greatly reduced.

Figure 1D:
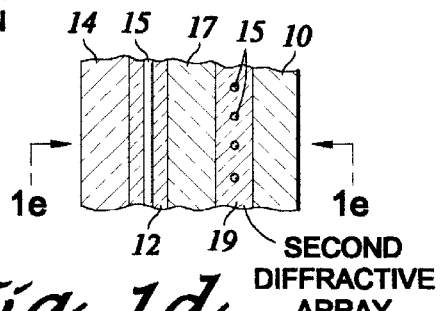
Figure 1E:
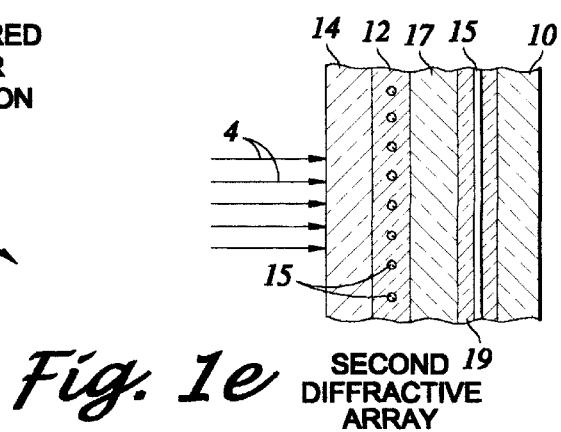

In a particularly useful embodiment of the present invention, shown in Figure 1d, there can be more than one layer which contains a diffractive array. These layers can be arranged such that the planes of each array are parallel while the arrays are at different angles with respect to one another as incident radiation "sees" them. The incident radiation will therefore be diffracted in three dimensions rather than two, thus further diminishing the effective radiation which penetrates the structure. When two diffractive arrays are used, it is preferred that the arrays are arranged such that the fibers of one array are substantially perpendicular to those of the second array.

The above described aspects of the present invention were discussed with reference to a three-layered structure. It should be understood by those skilled in the art that the embodiments shown are merely illustrative and that various modifications can be made in construction and arrangement within the scope of the invention as defined in the appended claims.

What is claimed is:

1. A multi-layer laser resistant structure comprising:
    a) an outer layer,
    b) an intermediate layer, and
    c) an inner layer
said outer, intermediate and inner layers having substantially equal indices of refraction in the visible portion of the electromagnetic spectrum, said outer and inner layers being partially absorptive to incident laser radiation, such that the outer layer partially ablates under the influence of incident radiation to initially diffract the incident radiation said intermediate layer including monofilaments embedded therein to further diffract the incident radiation such that the laser resistant structure substantially mitigates on-axis intensity of the incident laser radiation.

2. A multi-layer laser resistant structure comprising:
    an outer layer;
    an intermediate layer;
    an inner layer; and
    a first diffractive array of a plurality of monofilament fibers embedded in said intermediate layer substantially parallel to its surfaces,
said outer, intermediate and inner layers and said monofilament fibers having substantially equal indices of refraction in the visible portion of the electromagnetic spectrum and said outer and inner layers being partially absorptive to incident laser radiation, such that the outer layer partially ablates under the incidence of the laser radiation to initially diffract the incident laser radiation, said first diffractive array further diffracting laser radiation transmitted to said intermediate layer for substantially mitigating on-axis intensity of incident laser radiation.

3. The laser resistant structure in accordance with claim 2 further comprising an additional intermediate layer which includes a second diffractive array of said monofilament fibers in a plane substantially parallel to said first diffractive array but with the fibers in said second array being substantially perpendicular to the fibers in said first array to provide three dimensional diffraction of incident laser radiation.

4. A multi-layer laser resistant structure comprising:
    an outer layer;
    an intermediate layer;
    an inner layer; and
    a plurality of monofilament fibers embedded in said intermediate layer,
said monofilament fibers having a varying index of refraction across their cross-sections at a wavelength of anticipated laser radiation and said outer, inner and intermediate layers and said monofilament fibers having substantially equal indices of refraction in the visible portion of the electromagnetic spectrum, said outer and inner layers being partially absorptive to incident laser radiation, such that the outer layer partially ablates under the incidence of the laser radiation to initially diffract the incident laser radiation, said monofilaments further diffracting laser radiation transmitted to said intermediate layer to substantially mitigate on-axis intensity of the incident laser radiation.

5. The laser resistant structure in accordance with claim 4 further includes at least one additional intermediate layer containing a second diffractive array of said monofilament fibers in a plane substantially parallel to said first diffractive array but with the fibers in said second array being substantially perpendicular to the fibers in said first array to provide three dimensional diffraction of incident laser radiation.

* * * * *